United States Patent [19]

Sijercic et al.

[11] Patent Number: 6,049,757
[45] Date of Patent: Apr. 11, 2000

[54] PARAMETRIC MODELING OF WELL LOG DATA TO REMOVE PERIODIC ERRORS

[75] Inventors: Zlatko Sijercic; Thomas D. Barber, both of Houston, Tex.

[73] Assignee: Schlumberger Technology Corporation, Houston, Tex.

[21] Appl. No.: 09/139,828

[22] Filed: Aug. 25, 1998

[51] Int. Cl.⁷ .................................................... G06F 19/00
[52] U.S. Cl. .................................................................. 702/6
[58] Field of Search ........................... 702/6–9; 324/338, 324/339, 343, 342

[56] References Cited

U.S. PATENT DOCUMENTS 5,579,248  11/1996  Nieto et al. .

OTHER PUBLICATIONS

S. C. Pei and C. C. Tseng, "IIR Multiple Notch Filter Design Based on Allpass Filter," *IEEE Transactions on Circuits and Systems II: Analog and Digital Signal Processing*, vol. 44, No. 2, pp. 133–136 (Feb. 1997).

*Primary Examiner*—Donald E. McElheny, Jr.
*Attorney, Agent, or Firm*—John J. Ryberg; Brigitte L. Jeffery; Victor H. Segura

[57] ABSTRACT

The present invention is directed to a method for removing periodic errors from well log data. The method comprises defining a parametric model of well log data to identify periodic errors due to the borehole environment are present, and removing the periodic errors from the well log data.

28 Claims, 8 Drawing Sheets

PARAMETRIC MODELING OF WELL LOG DATA TO REMOVE PERIODIC ERRORS

BACKGROUND OF THE INVENTION

1. Field of the Invention

The present invention is generally directed to the analysis of well log data, and, more particularly, to the removal of periodic errors from well log data.

2. Description of the Related Art

Generally, well bores are not uniform throughout their length, but have a variety of irregularities that are generally referred to as borehole rugosity. Borehole rugosity may be caused by a number of factors. For example, some methods of drilling can produce boreholes that are slightly spiral, i.e., the rotation of the drill pipe and/or downhole drilling motor can produce a borehole having different diameters throughout its length. When a logging tool, such as an array induction tool, gamma ray tool, neutron tool, etc., is positioned in the borehole, the rugosity of the borehole changes the amount of standoff of the tool at different locations along the length of the borehole. These differences in standoff can produce periodic errors in the well log data obtained by the tool.

Often, periodic errors in well log data due to borehole rugosity are treated by well log analysts as interference since the periodic errors do not represent the particular formation under consideration, nor do they represent a normal tool reading that would be expected in a non-rugose borehole. Moreover, in some cases, periodic errors due to the rugosity of the borehole can completely smear a well log, e.g., a borehole having a corkscrew rugosity where there is a strong sinusoidal corkscrew signal coupled with its harmonics.

One technique proposed for removing sinusoidal noise due to borehole rugosity is described in U.S. Pat. No. 5,579,248, entitled "Method for Removing Borehole Rugosity Noise From Well Log Data." The technique disclosed therein involves the steps of detrending the well data, saving the non-stationary trend information of the data, calculating a Fourier amplitude spectrum of the residual series, identifying rugosity peaks in the amplitude spectrum of the residual series, applying a single frequency notch filter to the residual series, and adding the filtered residual series back to the saved trended data.

However, the technique disclosed in U.S. Pat. No. 5,579,248 has several shortcomings. In particular, the method described therein involves the use of a complicated cubic splines procedure to detrend and restore the data, it does not disclose a method for automatic identification of the periodic errors due to borehole rugosity on a frequency spectrum, it does not disclose a technique for estimation of the frequency of periodic errors due to borehole rugosity, and only a single frequency notch filter is proposed to remove periodic errors. Such shortcomings can result in, among other things, increased time and computing requirements for determining and removing the sinusoidal noise from the well log data.

The present invention is directed to a method and apparatus that solves or reduces some or all of the aforementioned problems.

SUMMARY OF THE INVENTION

The present invention is directed to a method of removing periodic errors from well log data. The method comprises defining a parametric model of the well log data to identify periodic errors due to the borehole environment are present, and removing the periodic errors from the well log data. In one embodiment of the present invention, the act of defining a parametric model of the well log data may be comprised of evaluating the well log data to identify periodic errors that exceed a preselected magnitude, and determining the frequency of each of the periodic errors exceeding the preselected magnitude.

In a further description of the invention, evaluating the well log data to identify periodic errors that exceed a preselected magnitude comprises segmenting the data into windows and determining a plurality of coefficients of the previously defined parametric model. In yet another illustrative embodiment of the present invention, the method of removing the periodic errors from the well log data comprises constructing a notch filter to remove at least one of the periodic errors from the well log data, and filtering the data through the notch filter.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF THE INVENTION

Figure 1:
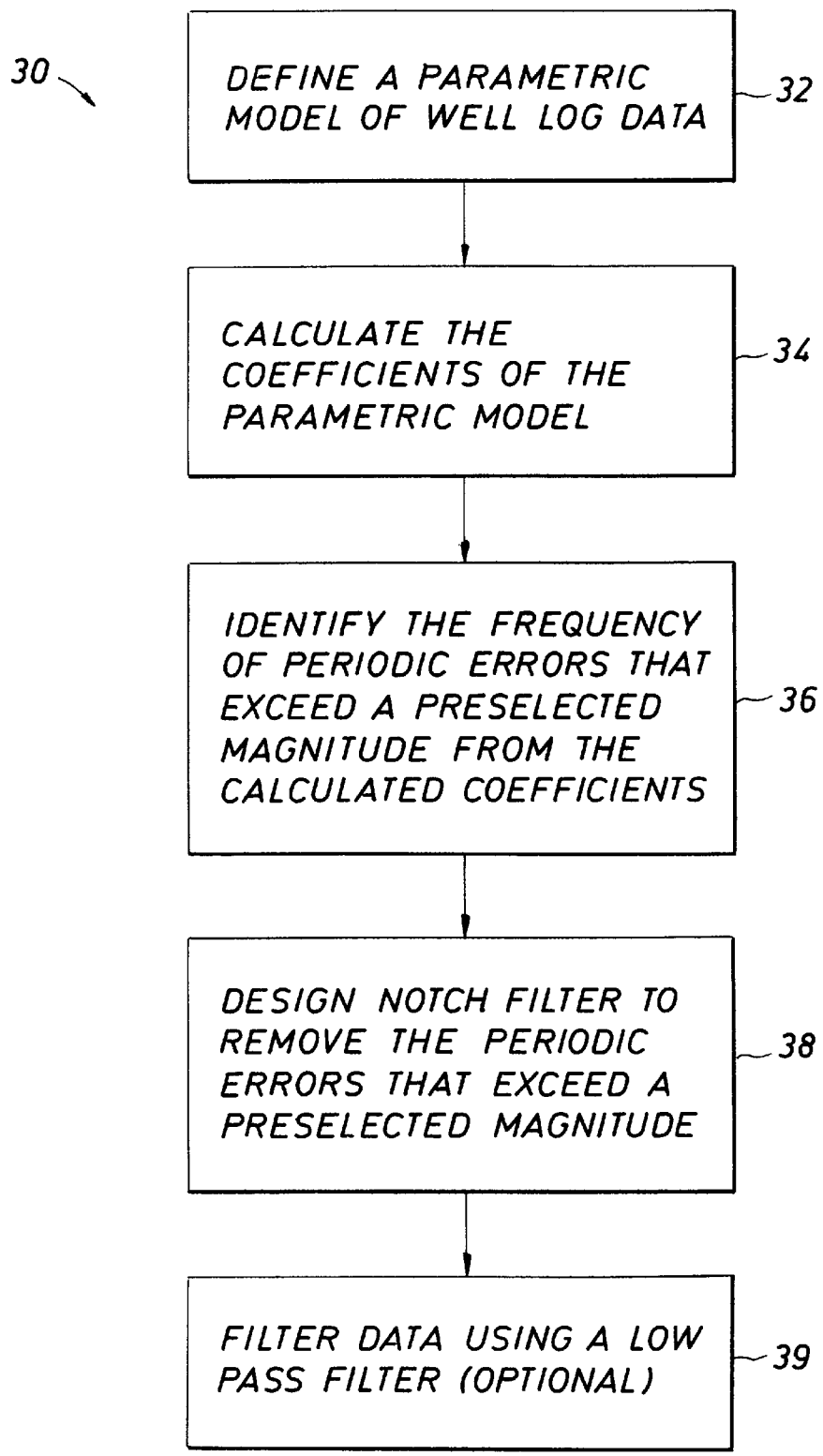
FIG. 1 is a flowchart of a general embodiment of the present invention.

The present invention will now be described with reference to the attached drawings. FIG. 1 is a flowchart of a general embodiment 30 of the present invention. In general, the present invention is comprised of defining a parametric model of well log data at block 32; calculating the coefficients of the parametric model at block 34; identifying the frequency of unwanted periodic errors that exceed a preselected magnitude from the calculated coefficients at block 36; and designing one or more notch filters to remove the periodic errors that exceed a preselected magnitude at block 38. If desired, the well log data may then be filtered through a low pass filter, as indicated at block 39.

Figure 2:
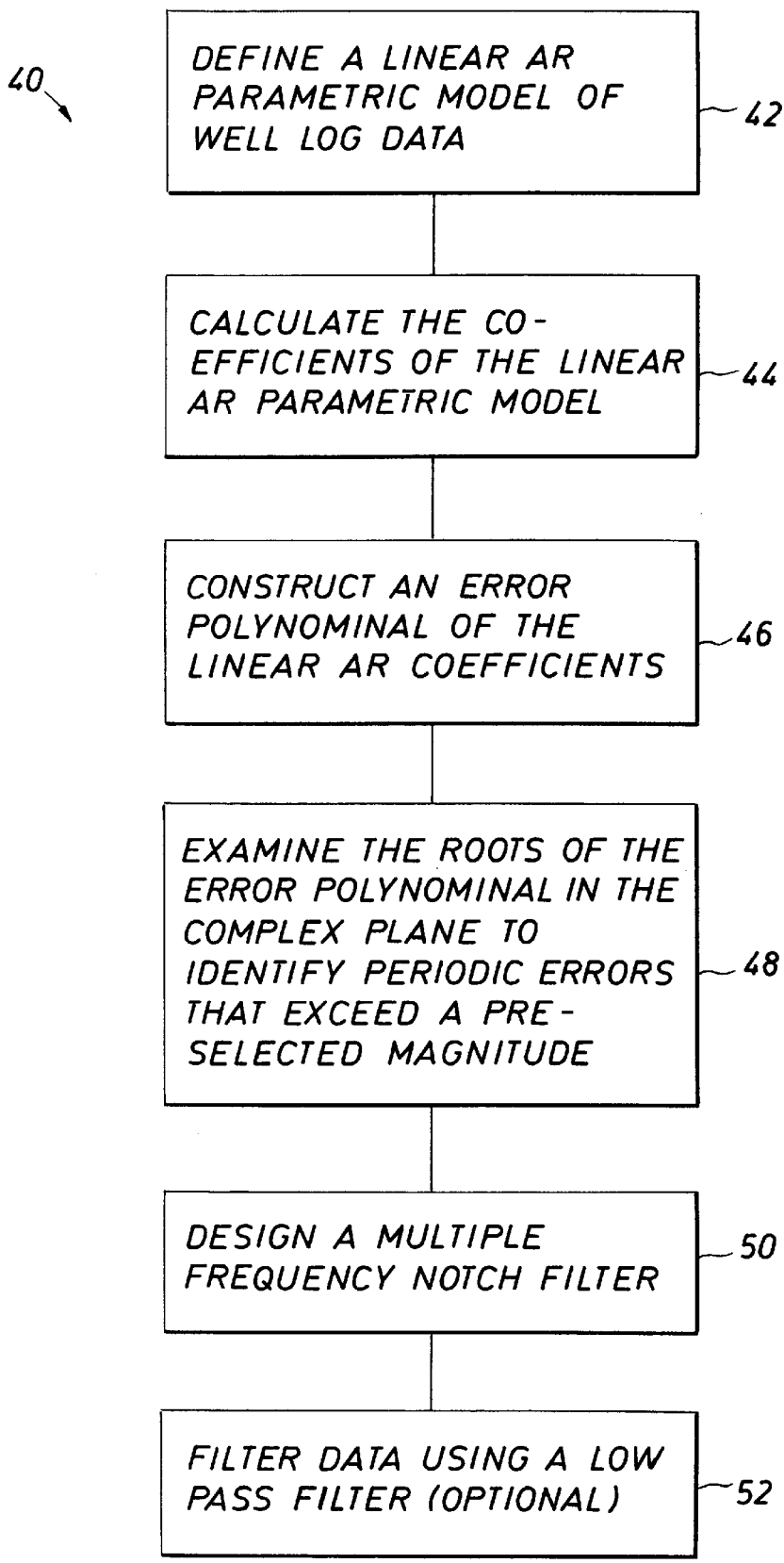
FIG. 2 is a flowchart of an illustrative, specific embodiment of the present invention.

FIG. 2 is a flowchart of one illustrative embodiment 40 of the present invention employing a linear auto-regressive ("AR") parametric model of the well log data. The specific embodiment 40 of the present invention is comprised of defining a linear AR parametric model of the well log data at block 42; calculating the coefficients of the linear AR parametric model at block 44; constructing an error polynominal of the linear AR coefficients at block 46; examining the roots of the error polynominal in the complex plane to identify periodic errors that exceed a preselected magnitude at block 48; and designing a multiple frequency notch filter to remove the unwanted periodic errors at block 50. As with the general embodiment 30 of the present invention described above, if desired, the well log data may then be filtered using a low pass filter at block 52.

The present invention is directed to a method for removing periodic errors due to the borehole environment from well log data irrespective of the type of well log data or the well logging tool used to obtain such data. For purposes of this disclosure, the term "well log data" should be understood to mean a sequence of measurements as a function of depth and/or time.

Issues involved in removing such unwanted periodic errors include, among other things, detection and identification of the primary periodic errors and its harmonics, estimation of the frequency of the periodic errors and consequent removal of all of the unwanted errors. The present technique enables the well log data to be cleaned of such periodic errors both in real time, e.g., during logging while drilling or measurement while drilling, and off-line, e.g., at a computer center, without the need for a well log analyst. The present invention may be applied to any form of well log data, e.g., caliper data, resistivity data, porosity data, permeability data, etc. Moreover, the present invention may be used on well log data obtained by wireline tools, logging while drilling tools, or measuring while drilling tools, e.g., array induction tools, neutron tools, logging while drilling resistivity tools, logging while drilling density and neutron tools, gamma ray tools, etc. As will be readily apparent to those skilled in the art after a complete reading of the present application, the inventive method disclosed herein may be set forth in a software program to be run on a computer (a personal computer, for example), or could be implemented in a hardware design by a person of ordinary skill in the art given the following description.

The initial step of the method involves defining a parametric model of the well log data to identify periodic errors due to the borehole environment as indicated at block 32 of FIG. 1. Upon a complete reading of the present disclosure, those skilled in the art will readily recognize that a variety of different types of parametric models may be used with the present invention, e.g., linear, non-linear, linear auto regressive, adaptive, etc. The present invention will be further disclosed in the context of the specific embodiment 40 of the invention depicted in FIG. 2. However, the present invention should not be considered limited to the specific embodiment 40 described more fully below.

In one illustrative embodiment 40, the parametric model may be a linear AR parametric model of the well log data as indicated at block 42 in FIG. 2. However, the present invention should not be considered to be limited to a linear AR parametric model. The equation that defines the illustrative linear AR parametric model is set forth below:

$$x[n] = -\sum_{k=1}^{p} a_k x[n-k] \tag{1}$$

In equation (1), "$x[n]$" is the signal sample at point "$n$" in the well bore; "$p$" is the model order; "$a_k$" is the $k^{th}$ coefficient of the parameter model; and "$n$" is the location of the sample in the well bore.

The next step of the method involves calculating the coefficients of the linear AR parametric model as indicated at block 44 of FIG. 2. Those skilled in the art will recognize that the AR coefficients ("$a_k$") can be calculated by solving linear equations using any of a variety of well known procedures, such as an auto correlation method, a modified covariance method, a maximum entropy method, etc. In one illustrative embodiment, the AR coefficients may be determined by auto correlation.

Besides the AR coefficients, it is also possible to find an optimal value for "p" (model order) of the AR parametric model for each data segment by, for example, using the well known Akaike information criteria. The value of "p" is a matter of design choice that may vary depending upon the particular application in which the present invention is to be used. For our purposes, a value of p=28 was empirically selected. This selection was based, in part, on observations of well log data and experimentation with different sample quantities.

The use of a parametric model for the well log data allows straightforward detection and frequency estimation of any periodic errors, e.g., sinusoidal errors, etc. If there are significant periodic errors in the well log data, an estimation of the frequency of the errors may be obtained directly from the AR coefficients of the parametric model. For example, in the illustrative case where a linear AR parametric model is used, this may be accomplished by constructing a prediction error polynominal, as indicated at block 46 of FIG. 2, in accordance with the following equation:

$$e_p(x) = x^p + a_1 x^{p-1} + a_2 x^{p-2} + \ldots + a_p \tag{2}$$

In equation (2), "$x$" is a polynominal variable; "$a_{1 \ldots p}$" are coefficients of the AR parametric model; and "$p$" is the model order.

The next step involves examining the roots of the error polynominal defined above in the complex plane to identify unwanted periodic errors as indicated at block 48 of FIG. 2. In one illustrative technique, the roots of the error polynominal may be plotted, in the complex plane, and the angles of the first "$n$" zeros (where $0 \leq n \leq P/2$) of the error polynominal (described in equation (2) above) that are closest to the unit circle in the complex plane will reflect the frequency estimate of the dominant periodic errors. Using the present method, one can preselect the magnitude of the periodic errors that will warrant removal. That is, one can define a region, or disk, on a unit circle that corresponds with an unacceptable magnitude of the periodic errors. In this manner, the error polynominal zeros for the unwanted periodic error will appear inside some pre-specified disk on the unit circle. In our experience, we have found that defining a disk on a unit circle that covers regions from approximately 0.95 to 1 detects most of the periodic errors that appear on well logs, particularly induction logs. Of course, defining the magnitude of the unwanted periodic signals is a matter of design choice that may vary with the particular application under consideration. If it is desirable or necessary to detect periodic errors of a lesser magnitude, then the area of the preselected disk would be greater, e.g., the region could cover from 0.8–1.0 on a unit circle.

In our experience, well log data obtained by an array induction tool generally contains up to three periodic errors, i.e., harmonics. Thus, for well log data obtained from an array induction tool, removal of some or all of these errors may be sufficient. If desired, the frequencies of the periodic errors obtained using the present method may be compared with other well log data information, e.g., caliper data, in-phase (R) data, quadrature data (X), etc. Such comparisons, if performed, will allow confirmation of the frequencies of the periodic errors and possibly improve the ability to detect and remove such periodic errors.

To create a more robust parametric model, in one illustrative embodiment of the invention, the well log data may be divided into segments that are windowed, detrended and over-lapped by one third with adjacent data segments. For example, 384 point segments of well log data may be windowed using the known Hanning technique, detrended and overlapped in 128 points with each adjacent segment of well log data. Using the method disclosed herein, the AR coefficients may then be calculated on each such transformed segment.

Figure 3:
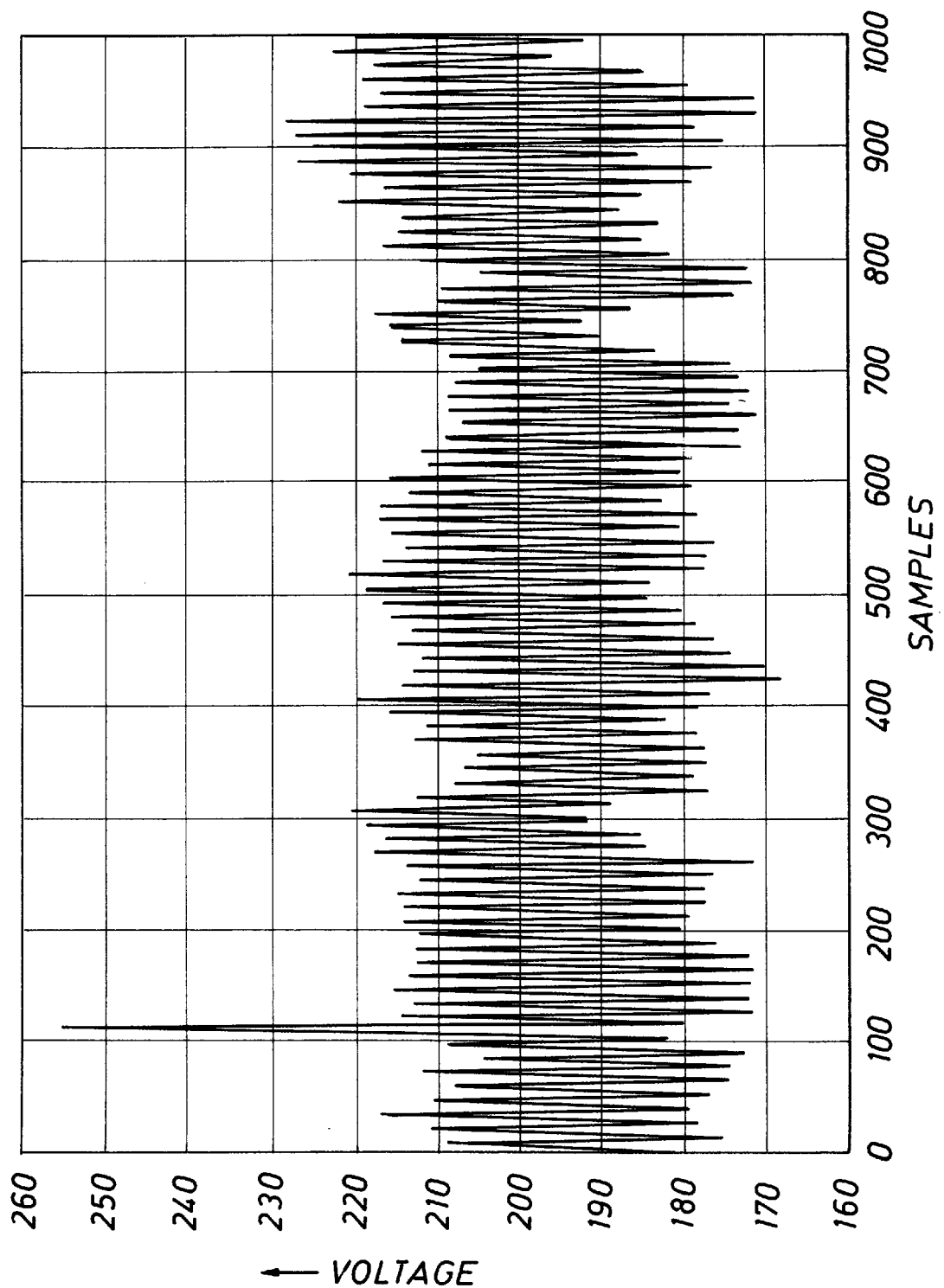
FIG. 3 is a data segment obtained from a well logging tool.
Figure 4:
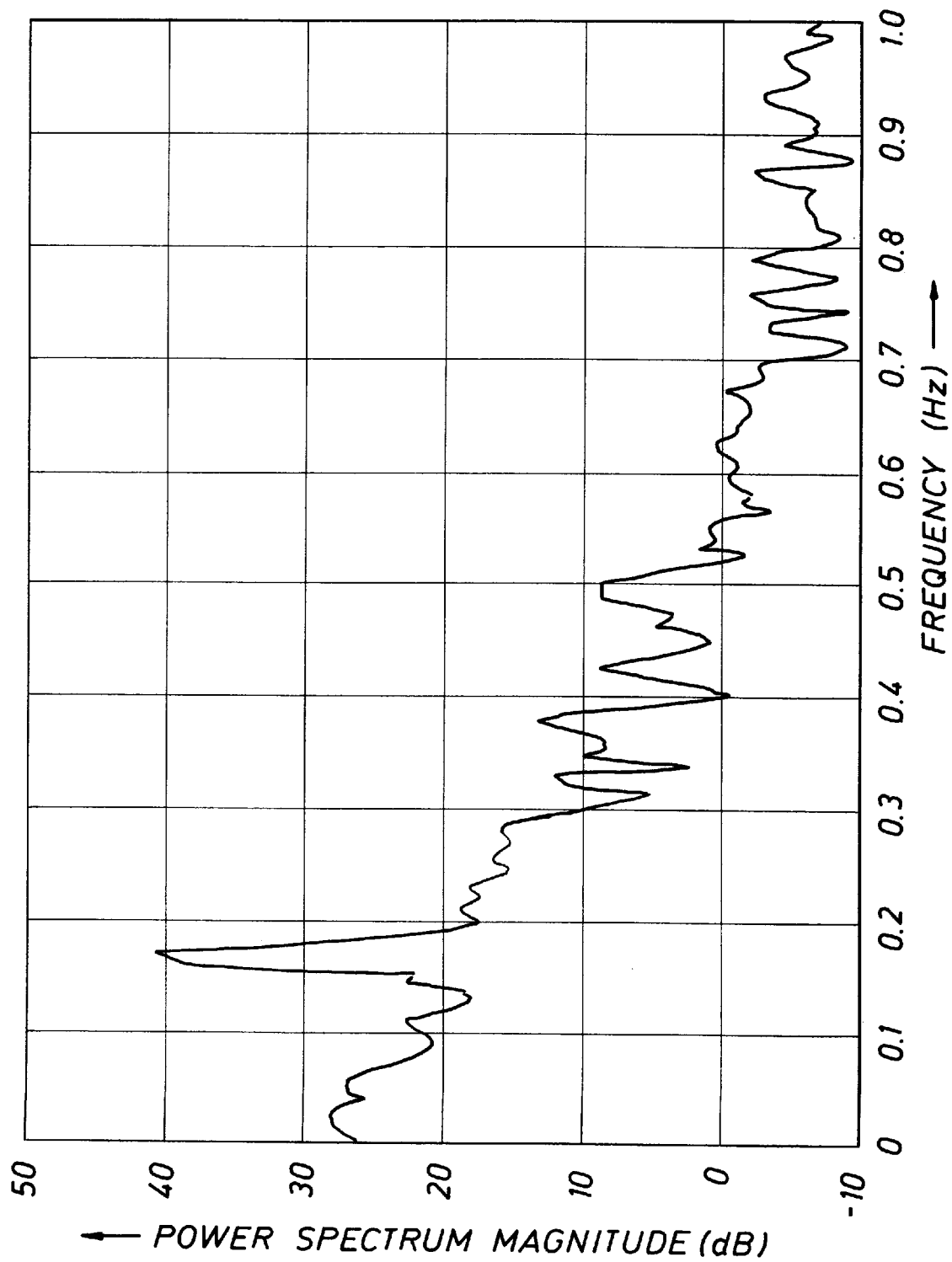
FIG. 4 is a power spectral density plot of the data segment depicted in FIG. 3.
Figure 5:
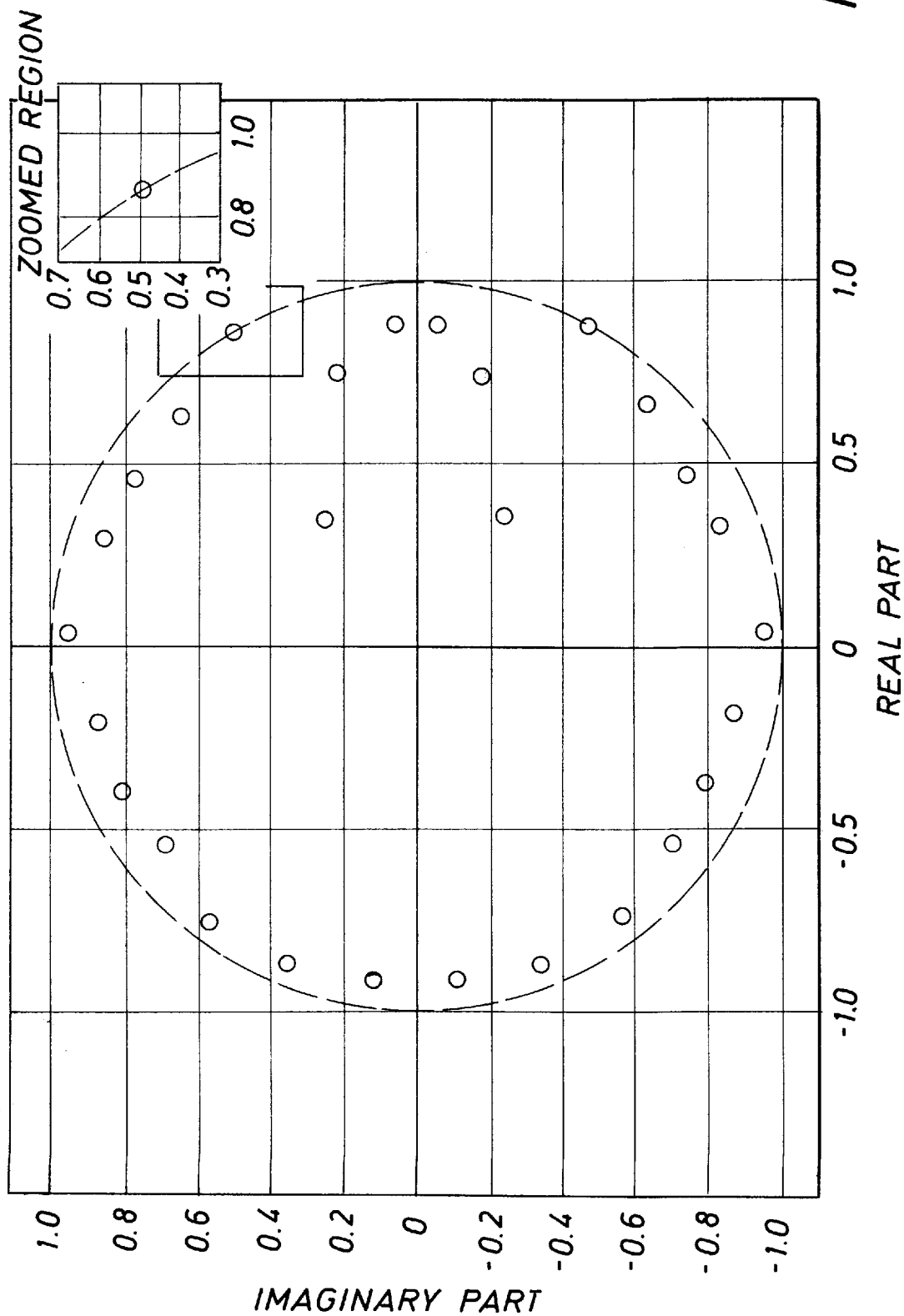
FIG. 5 is a plotting of the zeros of an error polynominal in accordance with the present invention.

An illustration of a portion of the method disclosed herein will now be described. FIG. 3 depicts a real data segment, i.e., voltage data, obtained from an array induction tool (AIT-H series) for the six inch array in-phase (R) signal. Those skilled in the art will readily recognize the visible sinusoidal corkscrew signal present in FIG. 3. FIG. 4 depicts a power spectral density (PSD) plot of the data shown in FIG. 3, after the data has been detrended and windowed. The PSD plot is based upon the well-known Welsh averaged periodogram method. The PSD plot shows one dominant harmonic error at a normalized frequency of 0.1641 Hz. The coefficients of the illustrative AR parametric model may be determined using equation (1) and a model order of p=28. Thereafter, the zeros of the error polynominal (equation (2)) are determined and plotted on FIG. 5. The zero that is the closest to the unit circle has an angle of approximately 0.5081 radius. On a normalized frequency scale, this value corresponds to approximately 0.1617 Hz which is very close to the frequency obtained by the PSD method.

The borehole diameter as represented by the caliper signal is typically the starting point for borehole rugosity signal detection for wireline induction logs. The main frequency value of the rugosity signal observed on caliper should be present in most of the other channels. Due to various sampling rates and signal acquisitions, some aliasing can be detected on other channels which is manifested as harmonics of the main frequency of the rugosity. The present invention can give an indicator of how strong the main rugose signal and its harmonics are. The indicator is obtained by detecting the presence of error polynominal zeros inside a pre-specified disk and their closeness to the unit circle. It is up to the user to decide whether to clean all of the unwanted periodic errors from the data. For example, it may be decided to only remove the most severe periodic errors from the data. However, this decision depends on the type of tool used to obtain the well log data, i.e., this decision is tool-specific.

Having determined that the well log data contains periodic errors of a sufficient magnitude to warrant removal, and the frequency of such errors, the identified periodic errors may be removed by filtering the data through a notch filter. As will be readily appreciated by those skilled in the art, one or more single frequency notch filters may be constructed using known techniques to remove the unwanted periodic errors. Alternatively, a multiple frequency notch filter may be constructed to remove the unwanted periodic errors as indicated at block 50 of FIG. 2. Additionally, the notch filter, be it a single or multiple frequency filter, may be either an infinite impulse response (IIR) filter or a finite impulse response (FIR) filter.

In one illustrative embodiment of the present invention, a multiple frequency IIR notch filter, having an all pass filter as its building block, is used. A variety of known techniques may be used to construct such a notch filter. For example, one such technique is described in S. C. Pei and C. C. Tseng, "IIR Multiple Notch Filter Design Based On Allpass Filter," *IEEE Transactions on Circuits and Systems II: Analog and Digital Signal Processing*, Vol. 44, No. 2, pp. 133–136 (Febuary 1997), which is hereby incorporated by reference in its entirety. Such filters have low coefficient sensitivity and provide fast filtering using a lattice structure, due, in part, to the mirror-image symmetry between the numerator and the denumerator polynominals of an all pass filter. Through use of the illustrative multiple frequency notch filter, as compared to a single frequency notch filter, the segmented data may be circulated through a notch filter fewer times. Additionally, the time required to construct one multiple frequency notch filter may be less than the time required to construct a plurality of single frequency notch filters.

If desired, the filtering of the segmented data through a notch filter, of whatever type, may be performed in a forward and backward direction to achieve zero-phase distortion. Additionally, if desired, after the periodic errors have been removed, the data may be filtered through an additional low pass filter, such as a Butterworth filter, to remove any residual high frequency noise in the data, as indicated at block 52 of FIG. 2.

Figure 6:
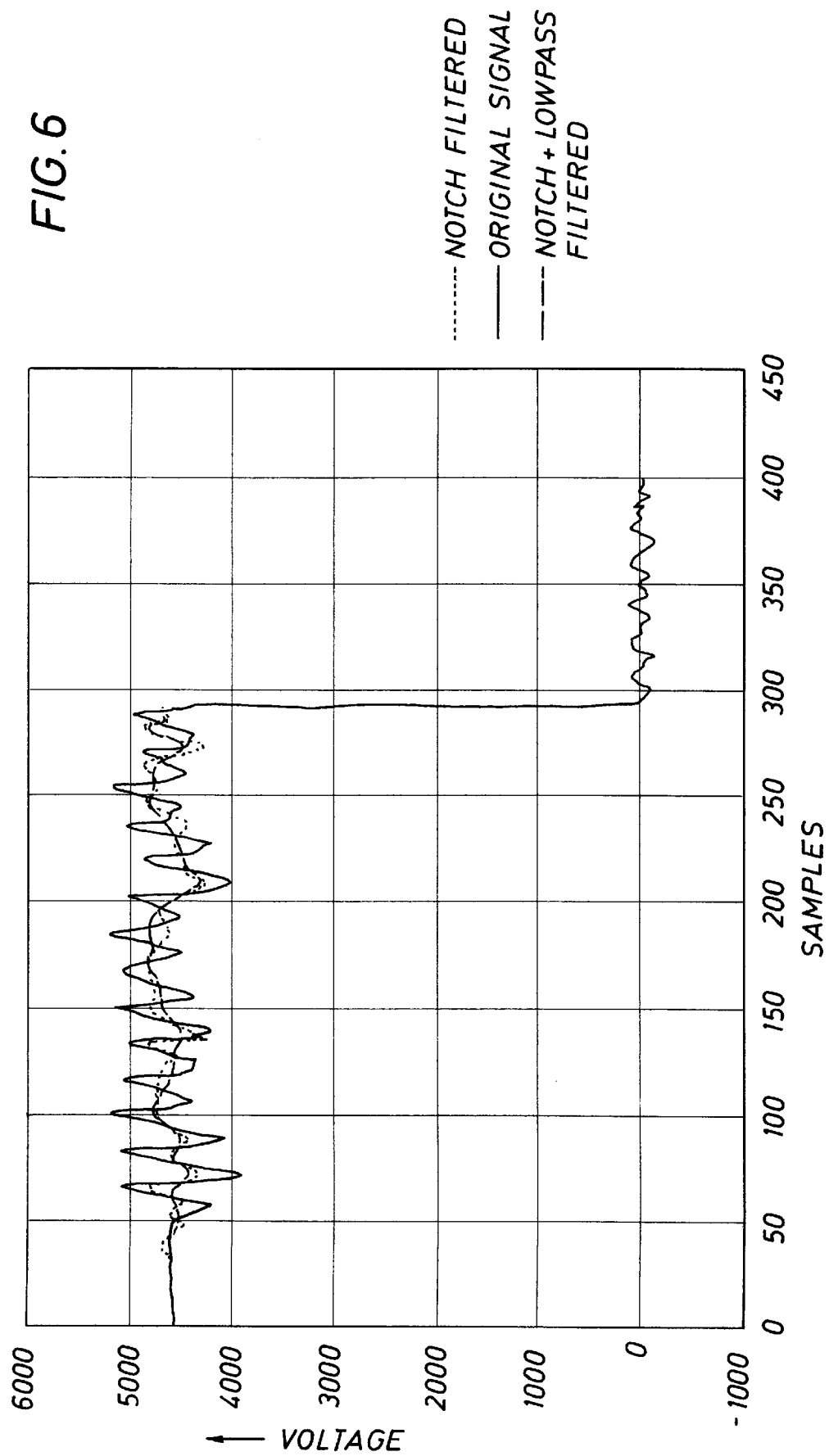
FIG. 6 is a plot of filtered versions of the well log data with and without an additional
Figure 7:
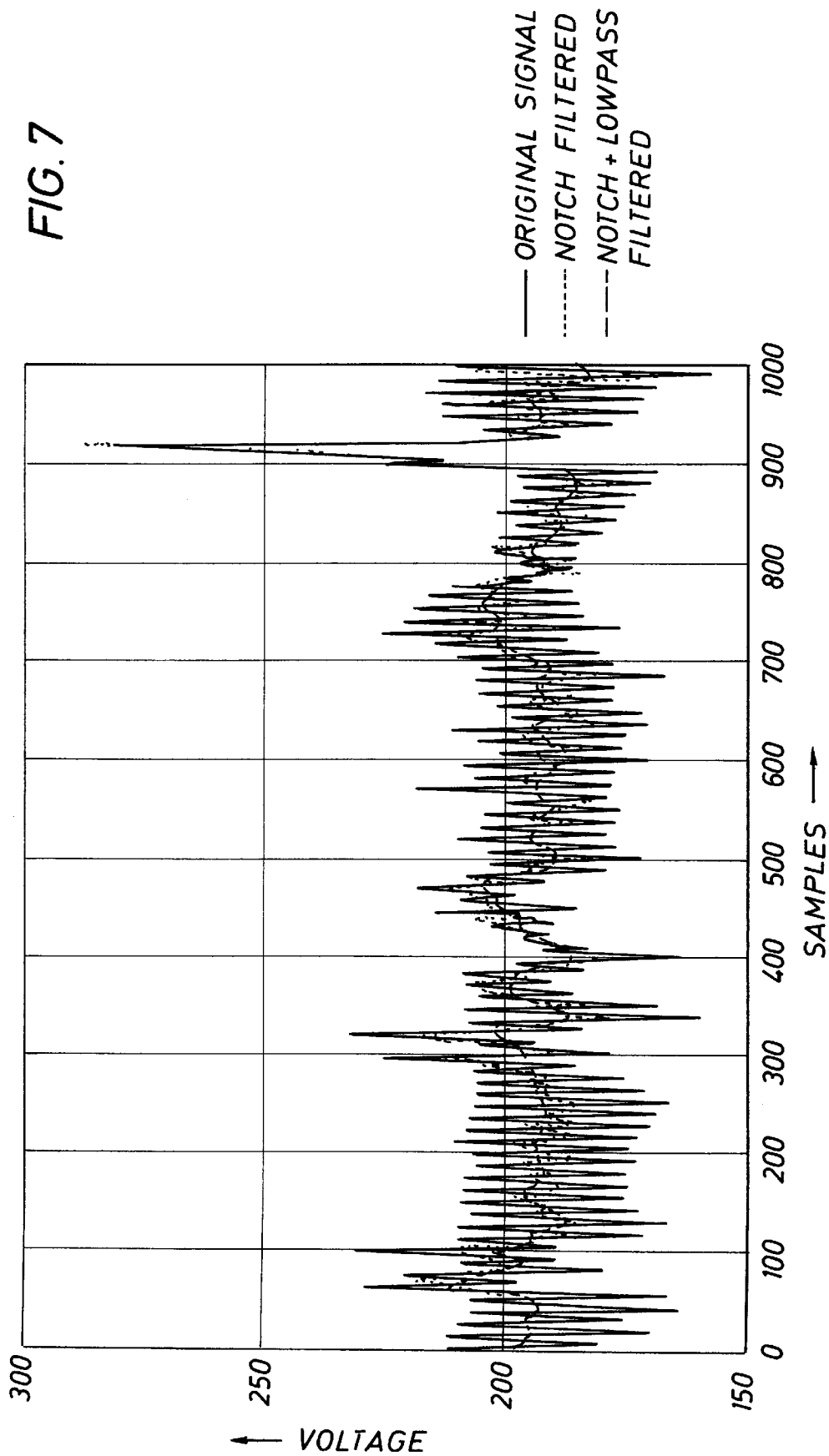
FIG. 7 is a time domain representation of well log data obtained from a well logging tool.
Figure 8:
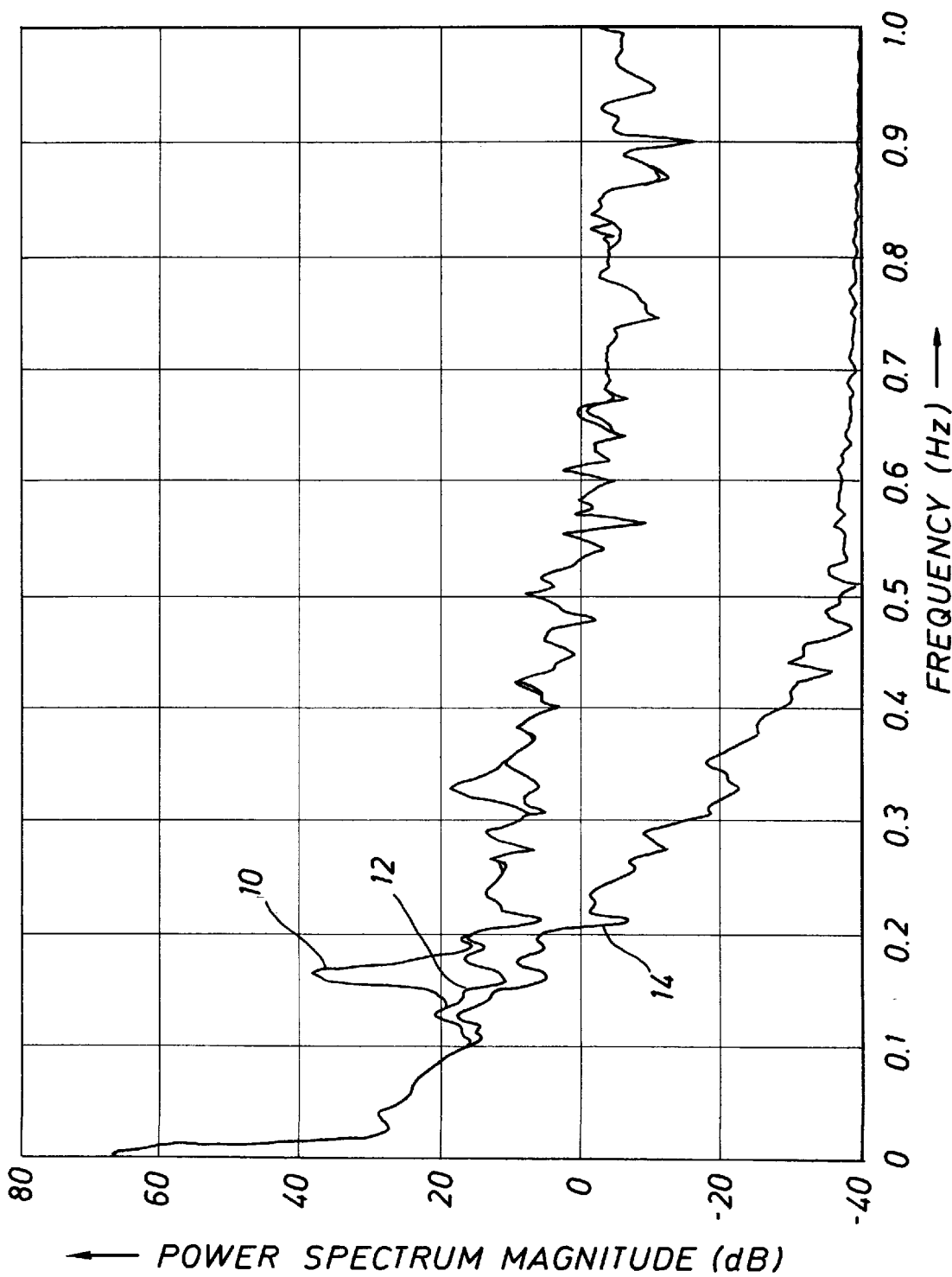
FIG. 8 is a power spectral density of well log data depicted in FIG. 6 before and after filtering.

The effectiveness of the present method may be demonstrated by reference to FIGS. 6–8. FIG. 6 depicts a portion of a highly non-stationary 6R wireline induction log signal corrupted by periodic errors (corkscrew rugosity). The entire signal was subjected to the method disclosed herein on a segment-by-segment basis. The method involved detection and cancellation of periodic components over a sequence of overlapping segments. The length of each segment was 384 points, each segment was windowed with a Hanning window and overlapped adjacent segments by 128 points. Filtered versions of the entire signal are depicted in FIG. 6, with and without additional low pass filtering. Note that, even though the original signal had a sharp drop around sample 300, the present method was able to identify it and filter out only the periodic errors.

FIG. 7 is a time domain representation of well log data, i.e., voltage data, obtained from an array induction tool. Whether there are periodic errors within the data depicted in FIG. 7 is not readily apparent from an inspection of that data. As shown more fully below, there are actually multiple periodic errors in the data.

FIG. 8 is a power spectral density of the well log data depicted in FIG. 7. In particular, FIG. 8 contains: a plot 10 of the original well log data, a plot 12 of the well log data after it has been filtered through a notch filter, and a plot 14 of the original well log data after it has been filtered through a notch filter and, subsequently, a low pass filter. That is, the periodic errors in the well log data, i.e., one at a frequency of approximately 0.16 Hz (the stronger) and one at a frequency of approximately 0.335 Hz (the weaker), are removed with the illustrative IIR all pass multiple frequency notch filter described above. Additionally, attenuation of high frequency signals may be obtained by filtering the data with a low pass filter whose cutoff is at the frequency of the first harmonic, e.g., 016 Hz.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of removing periodic errors from well log data, comprising:

defining a parametric model of well log data to identify periodic errors due to the borehole environment; and removing said periodic errors from said data.

2. The method of claim 1, wherein defining a parametric model of well log data to identify periodic errors due to the borehole environment comprises defining a linear parametric model of well log data to identify periodic errors due to the borehole environment.

3. The method of claim 1, wherein defining a parametric model of well log data to identify periodic errors due to the borehole environment comprises defining a non-linear parametric model of well log data to identify periodic errors due to the borehole environment.

4. The method of claim 1, wherein defining a parametric model of well log data to identify periodic errors due to the borehole environment comprises:

evaluating said data to identify said periodic errors that exceed a preselected magnitude; and determining the frequency of each of said periodic errors exceeding said preselected magnitude.

5. The method of claim 4, wherein evaluating said data to identify said periodic errors that exceed a preselected magnitude comprises:

segmenting said data into windows; and determining a plurality of coefficients of said parametric model.

6. The method of claim 4, wherein determining the frequency of each of said periodic errors exceeding said preselected magnitude comprises mathematically manipulating said coefficients of said parametric model.

7. The method of claim 1, wherein defining a parametric model of well log data to identify periodic errors due to the borehole environment comprises defining a parametric model of well log caliper data to identify periodic errors due to the borehole environment.

8. The method of claim 1, wherein defining a parametric model of well log data to identify periodic errors due to the borehole environment comprises defining a parametric model of well log data obtained from a wireline tool, a logging while drilling tool, or a measurement while drilling tool to identify periodic errors due to the borehole environment.

9. The method of claim 1, wherein removing said periodic errors from said data, comprises:

constructing a notch filter to remove at least one of said periodic errors from said data; and filtering said data using said notch filter.

10. The method of claim 1, wherein removing said periodic errors from said data, comprises:

constructing a multiple frequency notch filter to remove at least one of said periodic errors from said data; and filtering said data using said notch filter.

11. The method of claim 9, further comprising:

constructing a low pass filter to remove any residual high frequency noise in said data; and filtering said data using said low pass filter.

12. The method of claim 9, further comprising filtering said data through said notch filter in a forward and backward direction.

13. A method of removing periodic errors from well log data, comprising:

defining a parametric model of well log data;

evaluating said data to identify periodic errors that exceed a preselected magnitude;

determining the frequency of each of said periodic errors that exceed the preselected magnitude; and removing said periodic errors that exceed the preselected magnitude from said data.

14. The method of claim 13, wherein defining a parametric model of well log data comprises defining a linear parametric model of well log data.

15. The method of claim 13, wherein defining a parametric model of well log data comprises defining a non-linear parametric model of well log data.

16. The method of claim 13, wherein evaluating said data to identify periodic errors that exceed a preselected magnitude comprises:

segmenting said data into windows; and determining a plurality of coefficients of said parametric model.

17. The method of claim 13, wherein determining the frequency of each of said periodic errors that exceed the preselected magnitude comprises mathematically manipulating said coefficients of said parametric model.

18. The method of claim 13, wherein defining a parametric model of well log data comprises defining a parametric model of well log caliper data.

19. The method of claim 13, wherein defining a parametric model of well log data comprises defining a parametric model of well log data obtained from a wireline tool, a logging while drilling tool, or a measurement while drilling tool.

20. The method of claim 13, wherein removing said periodic errors that exceed the preselected magnitude from said data, comprises:

constructing a multiple frequency notch filter to remove at least one of said periodic errors from said data; and filtering said data using said notch filter.

21. The method of claim 20, further comprising:

constructing a low pass filter to remove any residual high frequency noise in said data; and filtering said data using said low pass filter.

22. The method of claim 20, further comprising filtering said data through said notch filter in a forward and backward direction.

23. A method of removing periodic errors from well log data, comprising:

defining a linear auto regressive parametric model of well log data;

evaluating said data to identify periodic errors that exceed a preselected magnitude;

determining the frequency of each of said periodic errors that exceed the preselected magnitude;

constructing a multiple frequency notch filter to remove at least one of said periodic errors that exceed the preselected magnitude from said data; and filtering said data using said notch filter.

24. The method of claim 23, wherein evaluating said data to identify periodic errors that exceed a preselected magnitude comprises:

segmenting said data into 384 point segments, said segments being overlapped in 128 points with each adjacent segment; and determining a plurality of coefficients of said parametric model.

25. The method of claim 23, wherein determining the frequency of each of said periodic errors that exceed the preselected magnitude comprises mathematically manipulating said coefficients of said parametric model.

26. The method of claim 23, further comprising:
   constructing a low pass filter to remove any residual high frequency noise in said data; and
   filtering said data using said low pass filter.

27. The method of claim 23, further comprising filtering said data through said notch filter in a forward and backward direction.

28. The method of claim 25, wherein mathematically manipulating said coefficients of said linear auto regressive parametric model, comprises:
   constructing an error polynominal of said linear auto regressive parametric model;
   finding the roots of said error polynominal; and
   determining which of said roots are closest to a unit circle on a complex plane.

* * * * *